United States Patent [19]

Sheler

[11] 3,823,791

[45] July 16, 1974

[54] STEERING AND DRIVE MECHANISM FOR FLOOR CLEANING MACHINE

[75] Inventor: Milo W. Sheler, Elkhart, Ind.
[73] Assignee: Keltec Inc., Elkhart, Ind.
[22] Filed: Oct. 25, 1972
[21] Appl. No.: 300,514

[52] U.S. Cl................ 180/6.66, 180/6.2, 180/19 H
[51] Int. Cl............................................. B62d 11/08
[58] Field of Search ........ 180/6.2, 6.66, 19 R, 19 S, 180/19 H

[56] References Cited
UNITED STATES PATENTS

| | | | |
|---|---|---|---|
| 1,355,826 | 10/1920 | Fawver | 180/6.66 X |
| 2,105,680 | 1/1938 | Weiss | 180/6.2 |
| 2,257,205 | 9/1941 | Thompson | 180/6.2 X |
| 2,519,270 | 8/1950 | Millar | 180/6.2 |
| 2,696,705 | 12/1954 | Greber | 180/19 R X |
| 3,151,503 | 10/1964 | Keller et al. | 180/6.66 X |

Primary Examiner—Albert J. Makay
Assistant Examiner—Leslie J. Paperner
Attorney, Agent, or Firm—Hobbs & Green

[57] ABSTRACT

A floor cleaning and scrubbing machine in which two main drive wheels located near the front of the machine are driven individually by a motor connected thereto by separate drives, each drive having a forward and reverse clutch therein. A steering mechanism controls the operation of the four clutches to operate one of the two clutches to steer the machine and includes a transversely positioned horizontal handle movable forwardly or rearwardly to drive the machine forwardly or rearwardly, and rotatable on a vertical axis to turn the machine in the right and left directions.

10 Claims, 4 Drawing Figures

STEERING AND DRIVE MECHANISM FOR FLOOR CLEANING MACHINE

A floor scrubbing and cleaning machine of a well known type is power operated and driven and includes a solution tank, a plurality of rotating scrub brushes utilizing the solution to clean the floor, a squeegee for collecting the dirty water, and a vacuum pickup system used in conjunction with the squeegee to remove the water and deliver it to a dirty water receiving tank.

The machine is normally driven electrically either from a battery unit on the machine or from an external source of current, although the machine may be driven by an internal combustion engine mounted on the machine. These machines may be steered manually or by a power system driven by the main power source for the machine. The steering systems used in the past have not been sufficiently responsive to the operator to maneuver the machine in and out of confined and irregularly shaped floor areas and/or have required substantial force applied by the operator to steer the machine effectively. It is therefore one of the principal objects of the invention to provide a floor scrubbing and cleaning machine which is highly maneuverable and responsive to the control of the operator and which can be operated effectively around obstructions and in a circuitous pattern with a minimum amount of effort by the operator.

Another object of the invention is to provide a steering system for a floor scrubbing machine or the like which is natural and easy to operate whether the operator walks with the machine or rides on a platform or seat on the machine or on a trailer attached thereto, and which can be controlled with one hand so that the operator can manipulate other controls and devices of the machine without releasing control of the propelling mechanism.

Still another object of the invention is to provide a floor scrubbing machine having a control system whereby the speed and propelling force of the machine vary as the pressure is applied to the control means by the operator and can be varied from zero to maximum as the pressure applied by the operator to the control means varies from zero to maximum, and in which neutral, forward and reverse are obtained by applying or releasing pressure at the control means without resorting to auxiliary controls such as a gear shift lever or motor reversing control.

A further object is to provide a vehicle steering and propelling system which is compact, efficient and durable and yet relatively simple and low in cost, and which can easily be serviced and adjusted for normal wear without any special tools and equipment.

Additional objects and advantages of the invention will become apparent from the following description and accompanying drawings, wherein.

Figure 1:
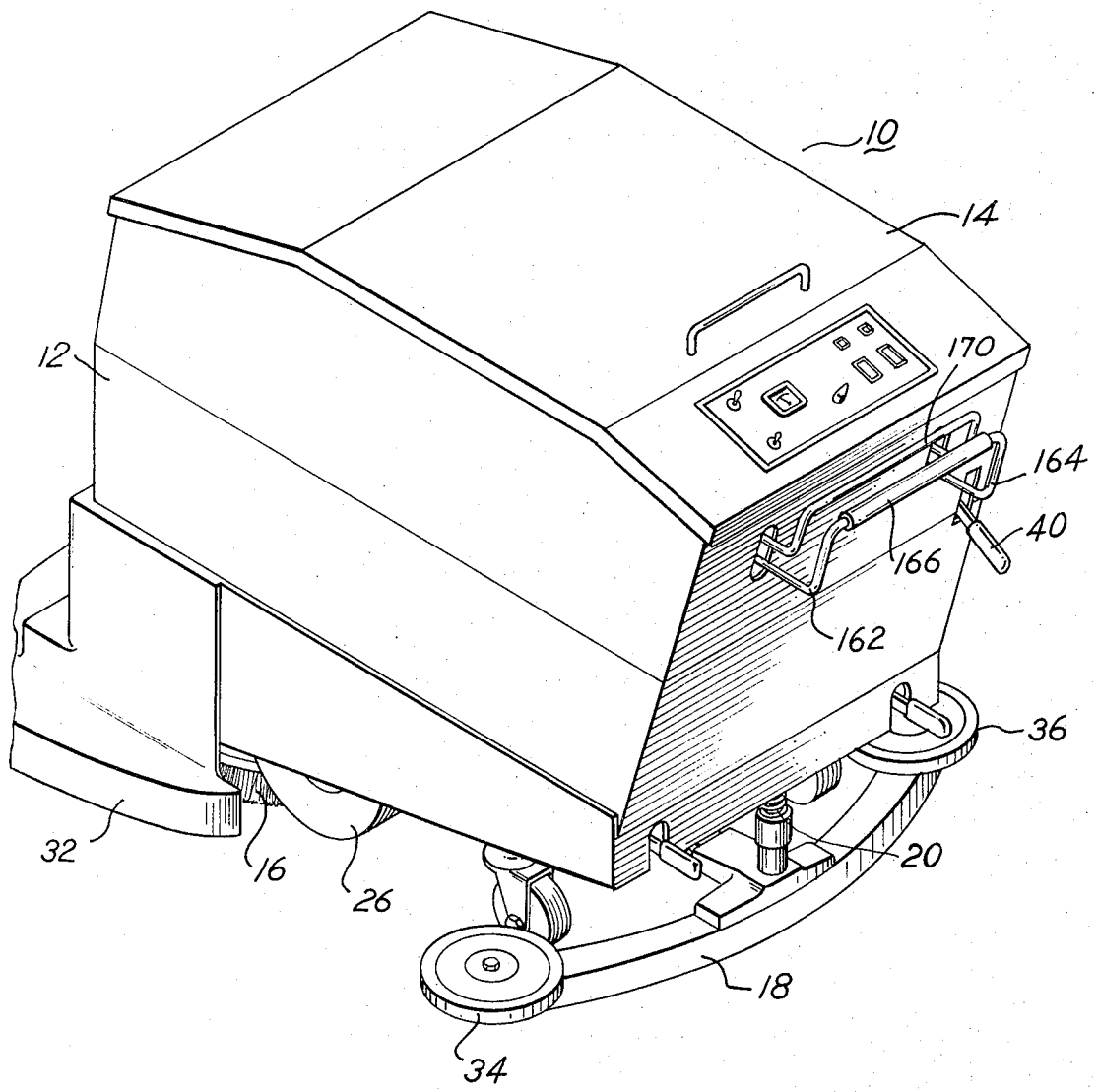
FIG. 1 is a perspective view of the floor scrubbing and cleaning machine embodying the present invention.
Figure 2:
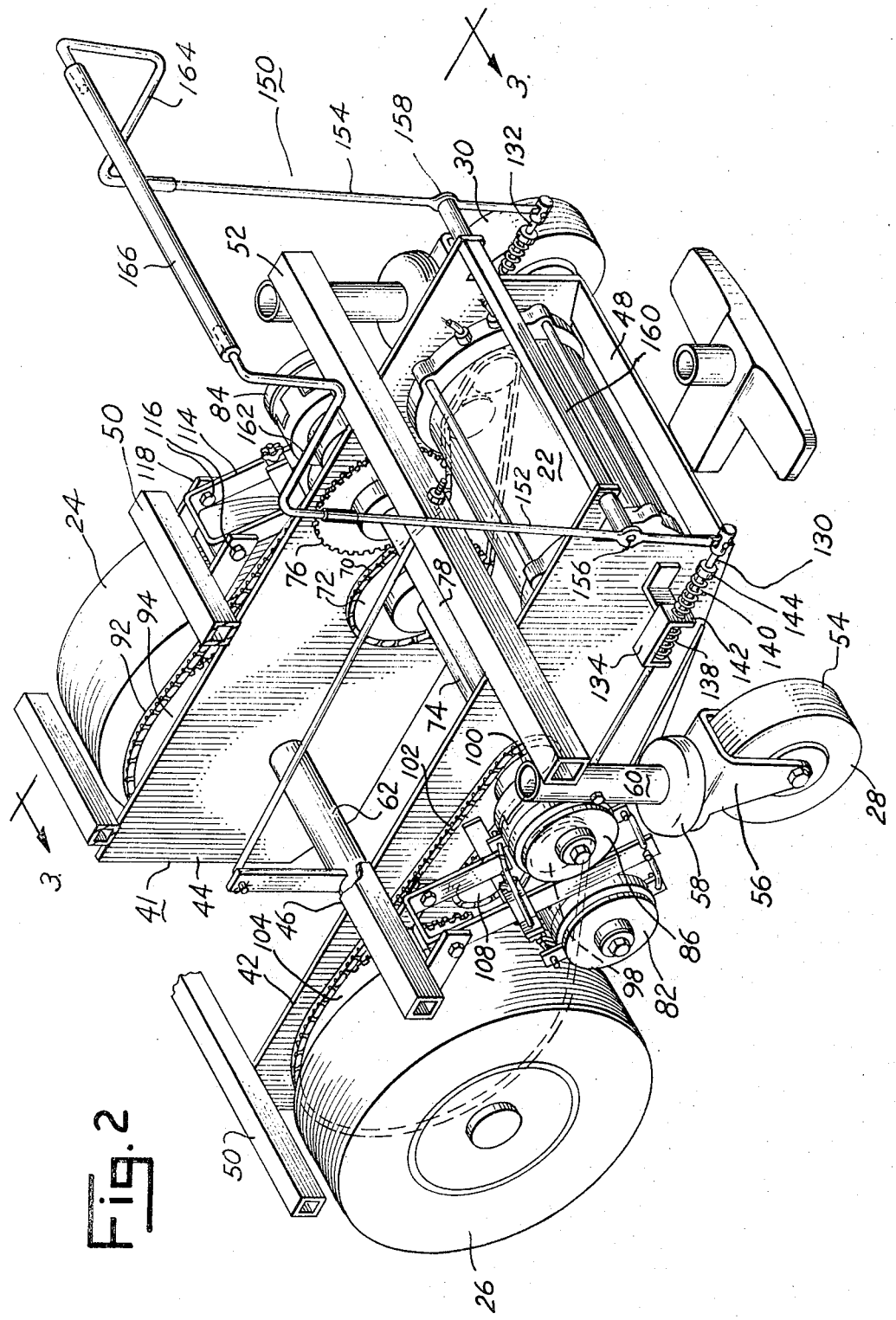
FIG. 2 is a perspective view of the drive and steering mechanism of the machine shown in FIG. 1.
Figure 3:
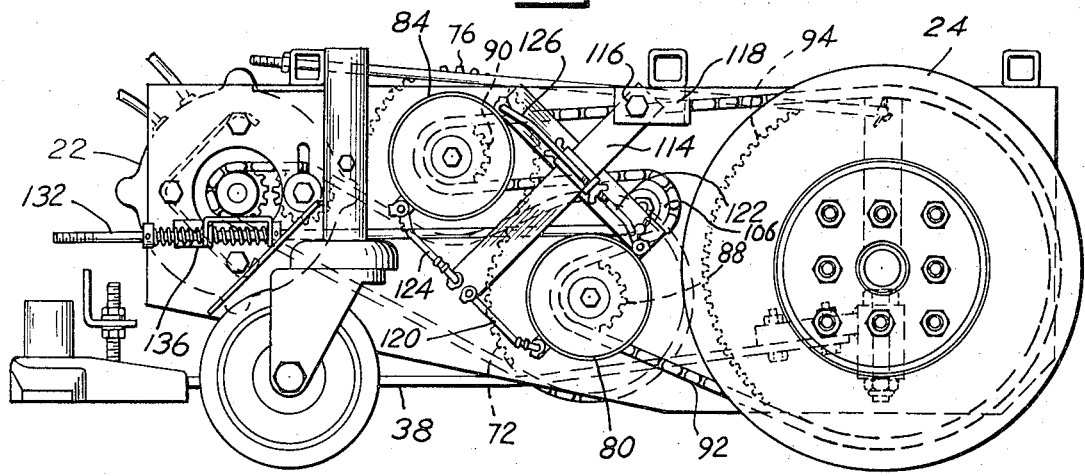
FIG. 3 is a side elevational view of the mechanism shown in FIG. 2.
Figure 4:
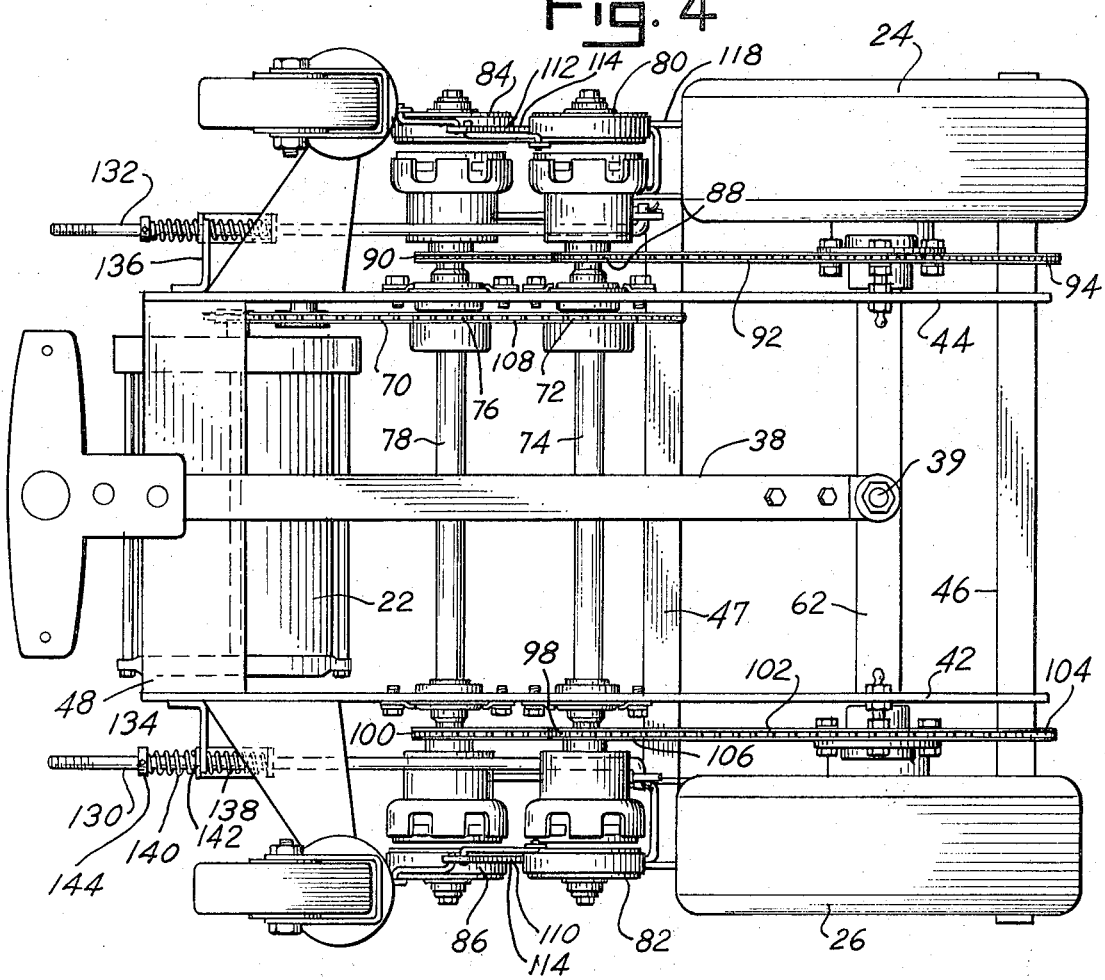
FIG. 4 is a bottom plan view of the mechanism seen in FIG. 3.

Referring more specifically to the drawings and to FIGS. 1 and 2 in particular, numeral 10 indicates generally a floor cleaning and scrubbing machine having a housing 12 containing a clean liquid solution tank and a dirty water tank under cover 14, the two tanks being of any suitable shape, preferably side-by-side tanks. A pair of rotating brushes indicated by numeral 16 is furnished with the clean fluid solution for scrubbing the floor, and a squeegee mechanism 18 removes the water from the floor and delivers it through a tube 20 to the dirty water tank. In the model illustrated in the drawings, the machine is driven by a battery powered motor 22 and is supported on main drive wheels 24 and 26 and casters 28 and 30. If desired, the machine may be driven from an electrical source through a cord, thus eliminating the batteries. However, the machine may be more readily maneuverable over a wider area conveniently by the use of an independent power source such as batteries. The brushes 16 are partially enclosed by a hood 32 suspended from the front of housing 12 and the squeegee preferably has bumper rollers 34 and 36 at each end. The squeegee is connected to the underside of the frame by a longitudinal spring bar 38 which is pivotally connected thereto by pivot 39. The spring bar permits the squeegee to adjust to variations in the surface of the floor. The squeegee is lifted and lowered by the use of a lever 40. The features apart from the wheels just described may be considered as conventional or standard features for the purpose of the present description, and hence will not be described in further detail herein.

The drive and control mechanism is shown more fully in FIG. 2 and is mounted on a main frame 41 having side plates 42 and 44 interconnected by a plurality of cross members 46, 47 and 48 to provide the required strength. The laterally extending members 50 support the tanks and batteries previously referred to herein, and laterally extending cross member 52, which is attached to the upper edge of plates 42 and 44, supports casters 28 and 30. Each caster consists of wheel 54 and bifurcated arm 56 in which the wheel is journalled and which is pivoted in bearing 58, the bearing being attached to stem 60 which in turn is connected to cross member 52. The casters turn freely to the right or left as the drive wheels 24 and 26 are rotated at different rates of speed so that the machine can readily be steered through the main drive wheels, as will be more fully explained hereinafter. The drive wheels are journalled on axle 62 and rotate freely thereon. These wheels are relatively large and are preferably provided with pneumatic tires.

The machine is driven by motor 22 through chain 70, and sprocket 72 on shaft 74 for the forward direction, and through sprocket 76 and shaft 78 in the reverse direction. Mounted on opposite ends of shaft 74 are forward clutches 80 and 82, and mounted on opposite ends of shaft 78 are reverse clutches 84 and 86. The two clutches 80 and 84 are connected to drive wheel 24 by sprockets 88 and 90, and chain 92 and sprocket 94, and clutches 82 and 86 are connected to drive wheel 26 by sprockets 98 and 100 and chain 102 and sprocket 104. Chains 92 and 102 are trained on sprockets 88 and 90 and 98 and 100, respectively, and over idle pulleys 106 and 108 for the left and right sides of the machine. Thus, when the two forward clutches 80 and 82 are engaged, the two drive wheels 24 and 26 are driven by the motor at a uniform speed in a straight forward direction, and when the two reverse clutches 84 and 86 are engaged, the drive wheels are driven rearwardly in a straight line.

The steering function on the machine is performed by the operation of the clutches through clutch actuating assemblies 110 and 112 on the left and right sides of the machine, each of the assemblies having a bracket 114 pivoted by a bolt or shaft 116 to a fixed bracket 118 on the frame. Movement of the clutch actuating assembly either forward or rearwardly engages the forward or rearward clutch on either side as the steering mechanism is moved by the operator.

The clutch actuating assemblies 110 and 112 are controlled by rods 130 and 132, respectively, which extend rearwardly along the side of plates 42 and 44 and are supported by brackets 134 and 136 on plates 42 and 44, respectively. The clutch actuating assembly is yieldably retained in neutral position by centering springs 138 and 140 reacting against center member 142 of the brackets. The tension on spring 140 is adjustable by adjustment collar and abutment 144 on rod 130. The sterring mechanism, indicated generally by numeral 150, controls the clutches through rods 130 and 132, the mechanism consisting of vertical rod 152 and 154 pivoted at 156 and 158 on bar 160, which in turn is secured to the rear of the main frame. The lower ends of rods 152 and 154 are pivotally connected to the ends of rods 130 and 132 so that movement of rods 152 and 154 either forwardly or rearwardly moves the actuating assembly to engage either the forward or the reverse clutch. In order to give the operator full control and feel in the operation of the machine, the two vertical rods 152 and 154 are interconnected by rods 162 and 164 and handle 166. The two curved rods are rotatably connected to the upper ends of rods 152 and 154 and pivotally connected to handle 166, thus permitting control of both vertical rods 152 and 154 together or independently to obtain the desired right or left movement of the machine, using a natural movement by the operator for obtaining the desired steering action.

In order to facilitate control of the machine by handle 166, a second fixed handle 170 is provided so that the operator can grasp both handles and merely move handle 166 forward by squeezing the two handles. This permits the operator to ease the machine forwardly and to control the speed effectively. The handle is mounted on and rigidly secured to the housing or a frame member in the housing (not shown).

In the operation of the machine, with motor 22 running and the steering mechanism in neutral, i.e., with springs 138 and 140 on each side holding rods 130 and 132 in centered position, shafts 74 and 78 are rotating; however, all four clutches are disengaged. When the operator desires to move fowardly, he grasps the two handles 166 and 170 and squeezes them sufficiently to move handle 166 forwardly, which in turn pivots rods 152 and 154 forwardly, moving rods 130 and 132 rearwardly to operate the clutch actuating assemblies for the forward clutches 80 and 82 on the opposite sides of the machine. The engagement of the two forward clutches causes chains 92 and 102 to rotate the two wheels 24 and 26, and thus drive the machine forwardly. In order to steer the machine either to the right or left, the handle 166 is rotated on a horizontal axis relative to handle 170. For example, if the operator wishes to turn right, the left-hand end of handle 166 is moved forwardly, rotating the handle in a clockwise direction, causing rod 152 to engage clutch 82 and thereby causing wheel 26 to rotate without rotating wheel 24. This causes the machine to steer to the right. The movement of the right-hand end of handle 166 forwardly while retaining the left-hand end stationary causes clutch 80 to operate to engage drive chain 92 and thus drive wheel 24, causing the machine to steer to the left. If a sharp turn is desired, for example to the right, the left-hand end of handle 166 is moved forwardly and the right-hand end is moved rearwardly, thus engaging clutches 82 and 84, causing chain 102 to drive wheel 26 forwardly and chain 92 to drive wheel 24 rearwardly. Since the two wheels are then operating in the reverse direction relative to one another, the machine will make a sharp turn to the right. The opposite manipulation of handle 166 will cause the machine to turn sharply to the left. In order to reverse the direction of the machine, handle 166 is pulled rearwardly, parallel to handle 170, thus engaging clutches 84 and 86, causing chains 92 and 102 to drive wheels 24 and 26 in reverse, thus reversing the direction of the machine. While the two wheels are steering the machine, casters 28 and 30 rotate on their vertical axes and cause the rear end of the machine to follow effectively the operation of the drive wheels 24 and 26. The operation of one or the other clutches 84 and 86 will cause the machine to steer to the left or right. This is accomplished by rotating handle 166 either in the clockwise or counterclockwise direction relative to handle 170 in the manner previously described with reference to steering the machine in the forward direction.

In some machines it may be desirable to have the drive wheels at the rear and the casters at the front of the machine. This change can be made without changing the basic concept of the present invention. While only one embodiment of the present steering and drive mechanism for floor cleaning and scrubbing machines has been described in detail herein, various changes and modifications may be made without departing from the scope of the invention.

I claim:

1. A steering and drive mechanism for a floor cleaning machine, comprising a pair of independently rotatable drive wheels, a forward and reverse clutch for each of said drive wheels, an operating and steering handle connected to said clutches disposed at the rear of the machine and including a horizontally positioned bar means mounted crosswise thereof for both angular and translatory movement, said bar means being movable forwardly and rearwardly for forward and reverse movement of the machine and movable angularly on a substantially horizontal plane for turning the machine to the right or left, and a second handle mounted on said machine in spaced relation to said first mentioned handle for assisting in controlling the machine with the first mentioned handle.

2. A steering and drive mechanism for a floor cleaning machine as defined in claim 1 in which said second handle is normally parallel to the first mentioned handle.

3. A steering and drive mechanism for a floor cleaning machine as defined in claim 1 in which said first mentioned handle is supported between two vertically positioned, spaced rods, one rod being connected to the forward and reverse clutches on one side of the mechanism and the other rod being connected to the forward and reverse clutches on the other side of the mechanism.

4. A steering and drive mechanism for a floor cleaning machine as defined in claim 1 in which a linkage connects one end of the first mentioned handle with the forward and reverse clutches for one drive wheel on one side of the machine and a linkage connects the other end of the first mentioned handle with the clutches for the wheel on the other side of the machine.

5. A steering and drive mechanism for a floor cleaning machine as defined in claim 4 in which said first mentioned handle is an elongated member and in which each linkage includes a clutch actuating assembly, a horizontally positioned rod connected to said assembly, and a vertically positioned rod connected at its lower end to said horizontally positioned rod and at its upper end to said first mentioned handle.

6. A steering and drive mechanism for a floor cleaning machine as defined in claim 1 in which a motor drives said drive wheels and is connected to said wheels by a pair of shafts driven in reverse direction to one another, clutches at each end of said shafts, a chain drive connecting said motor with said shafts, and a chain drive connecting said clutches with the respective drive wheel.

7. In a floor scrubbing machine: the mechanism including a main frame, two drive wheels at the front end of said main frame, a motor on said frame, forward and reverse clutches operationally disposed between said motor and each of said drive wheels, drive means connecting said motor to said clutches, drive means connecting said clutches and said drive wheels, control means for said clutches including a handle mounted for both angular and translatory movement, said handle being operable to steer the machine in the forward and reverse directions and to either side, and a second handle mounted on said machine in spaced relation to said first mentioned handle for assisting in controlling the machine with the first mentioned handle.

8. The mechanism in a floor scrubbing machine as defined in claim 7 in which said first mentioned handle is movable forwardly and rearwardly to drive the machine forwardly and rearwardly, and rotatable angularly on a vertical axis either right or left to steer the machine right or left.

9. The mechanism in a floor scrubbing machine as defined in claim 8 in which said first handle is an elongated horizontal member disposed transversely of the machine and said second handle is attached to the machine in substantially parallel relationship to the first mentioned handle.

10. The mechanism in a floor scrubbing machine as defined in claim 9 in which a pair of vertical rods supports the handle and a separate linkage including a horizontal rod connected to one of said vertical rods operates the clutches for the respective drive wheel.

* * * * *